April 18, 1944.   C. F. GEIGER ET AL   2,346,743
APPARATUS FOR TRANSFERRING GRANULAR MATERIAL
Filed Jan. 22, 1940   5 Sheets-Sheet 1

INVENTORS.
CHARLES F. GEIGER
CHANNING P. CLAPP
WILLIAM C. KEMPF
BY
ATTORNEY.

INVENTORS.
CHARLES F. GEIGER
CHANNING R. CLAPP
WILLIAM C. KEMPF.
BY
ATTORNEY.

April 18, 1944.   C. F. GEIGER ET AL   2,346,743
APPARATUS FOR TRANSFERRING GRANULAR MATERIAL
Filed Jan. 22, 1940   5 Sheets-Sheet 3

INVENTORS.
CHARLES F. GEIGER.
CHANNING P. CLAPP.
WILLIAM C. KEMPF.
BY
ATTORNEY.

April 18, 1944. C. F. GEIGER ET AL 2,346,743
APPARATUS FOR TRANSFERRING GRANULAR MATERIAL
Filed Jan. 22, 1940 5 Sheets-Sheet 4

INVENTORS.
CHARLES F. GEIGER
CHANNING P. CLAPP
WILLIAM G. KEMPF
BY
ATTORNEY.

April 18, 1944.   C. F. GEIGER ET AL   2,346,743
APPARATUS FOR TRANSFERRING GRANULAR MATERIAL
Filed Jan. 22, 1940   5 Sheets-Sheet 5

INVENTORS
CHARLES F. GEIGER
CHANNING P. CLAPP
WILLIAM C. KEMPF
BY
ATTORNEY.

Patented Apr. 18, 1944

2,346,743

UNITED STATES PATENT OFFICE 2,346,743

APPARATUS FOR TRANSFERRING GRANULAR MATERIAL

Charles F. Geiger, Metuchen, Channing P. Clapp, Woodbridge Township, Middlesex County, and William C. Kempf, Metuchen, N. J., assignors to The Carborundum Company, Niagara Falls, N. Y., a corporation of Delaware Application January 22, 1940, Serial No. 314,932

16 Claims. (Cl. 221—128)

This invention relates to improvements in apparatus for transferring granular or lump material or the like from containers in which such material is distributed. The present application is a continuation-in-part of a copending application, U. S. Serial No. 121,098 filed January 18, 1937, for Apparatus for distributing granular material and methods of distribution (issued as Patent No. 2,219,954 on October 29, 1940). In this copending application, apparatus for distributing granular material in bins of various shapes is described at length, the apparatus and methods being adapted to distribute not only ordinary granular materials but particularly granular material containing particles of different sizes, gravities, or kinds into a container in such a manner that equal volumes in different parts of the deposited mass contain substantially the same number of particles of a given size or nature. Such a distribution may be called a uniform distribution of particles of varying grit sizes or natures.

Such apparatus is useful, for example, in making a dense refractory or abrasive article, where it is desirable to have smaller particles distributed in the spaces between the larger particles, since this arrangement gives a closer packing than could be obtained with an aggregation of particles of the same grit size. Also in the case of a bonded abrasive article the presence of small hard particles properly distributed among larger hard particles gives a keying action of the small particles which reduces tendencies to relative motion among the larger particles and produces a stronger and tougher abrasive article. On the other hand segregation of larger hard particles in one part of an abrasive wheel and of smaller hard particles in another part of an abrasive wheel would give a wheel that would be out of balance and would produce uneven grinding action. Boundary regions between more closely packed portions of the wheel and less closely packed portions of the wheel would be zones of weakness where cracking would be likely to occur. In the case of refractories, segregation of granular materials used in their manufacture leads to uneven thermal expansion and renders the refractory product more subject to spalling. Such segregation, moreover, causes objectionable differences between successively produced articles.

The present application is particularly concerned with the removal of loose granular material or the like from a storage bin, particularly a bin where the material is distributed substantially without segregation. The applicants' problem is to remove the granular material from such a storage bin in such a manner that segregation of different grit sizes, or materials present in the bin, is not produced during the course of the removal. The solution of the problem depends:

(a) On the distribution of the outlets in the base of the storage bin, and (b) On the manner and means by which the granular material is removed from the outlets of the bin.

Favorable conditions for removing granular material from the lower part of the bin are illustrated by means of the accompanying drawings in which.

Arrows A are used to indicate the direction of motion of the belt conveyor or the direction of the impulse imparted to the grain by means of vibratory discharging mechanism.

Figure 1:
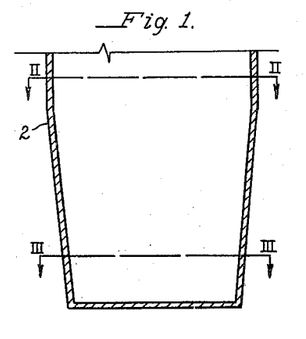
Figure 1 is a sectional elevation showing the lower portion of a bin which serves as a source of supply of granular material.
Figure 2:
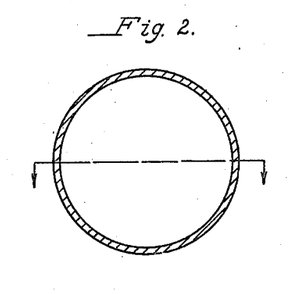
Figure 2 is a horizontal section on the line II—II of Fig. 1.
Figure 3:
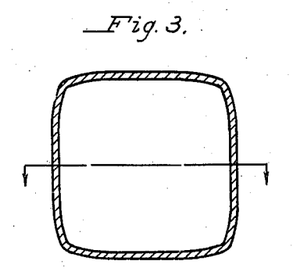
Figure 3 is a horizontal section on the line III—III of Fig. 1.

Referring to the drawings in detail, the storage bin 2 has a circular perimeter in its upper portion as indicated in Figure 2. It is not essential that the perimeter of the bin should be circular for the best conditions of transmission of granular material in an unsegregated condition. With certain of the devices described in our above-identified application for supplying non-segregated material to bins, it is, however, easiest to supply the material over a circular area, hence in this example a circular section has been indicated.

Figure 4:
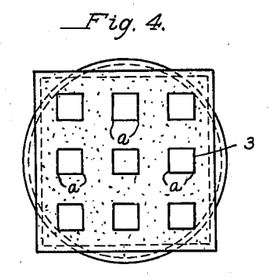
Figure 4 is a plan view of the bottom of the bin showing one arrangement of outlets.

For the simplest construction of outlets it is desirable that the base of the bin should be rectangular or square. In Figure 4 the base of the bin is shown as square. In a bin which is circular at the top and square at the base, the side wall of the bin is formed of specially shaped members which through a height of several feet in the lower part of the bin change the cross-sectional shape of the bin from a circle to a square of substantially the same area. By this means lateral movement of the granular material in the lower part of the bin is slight, so that segregation of grit sizes due to such lateral movements is negligible. Lateral movement of the grain in this system is not a serious matter for the reason that the grain is confined and there is little opportunity for the larger particles to roll or otherwise become segregated.

In Figure 4 a square base is shown with a plurality of symmetrically and uniformly spaced holes or discharge openings which are shown as square and of the same size for all of the various holes. Neither squareness nor uniformity of size is essential; but whatever their shape, the holes should be proportional in size to the areas which they drain and should be generally and uniformly spaced. For bins of ten or twelve feet in diameter, square holes of substantially equal area $a^2$ may be used, the value of the side $a$ of the square lying for example within the range 2 to 15 inches. For smaller bins the discharge openings are made correspondingly smaller. It is desirable that the areas of the holes comprise an appreciable percentage of the area of the base of the bin, for example, 20 to 75 per cent. The openings may constitute an even smaller or larger percentage of the area of the base under certain conditions.

Apparatus of the type described above is suitable for handling not only granular abrasive material but also for handling a wide variety of materials ranging from powders up to sizable lumps. Among such materials may be mentioned materials composed of metallic particles, cereal grains, grits, grogs, ceramic materials, coal, concrete ingredients or mixtures, glass batch mixtures, etc.

With respect to the dimensions of the discharge openings, the openings should be sufficiently larger than the diameters of particles of material being handled to permit ready passage of the material through the openings. The widths of the portions of the base between openings should be comparatively small so that the bottom of the bin is readily drained as soon as the conveyor surface is set in motion.

Figure 8:
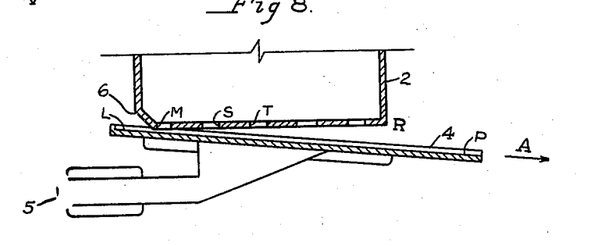
Figure 8 is a fragmentary elevation partly in section indicating vibratory discharging mechanism in suitable position relatively to the outlets of a bin.
Figure 9:
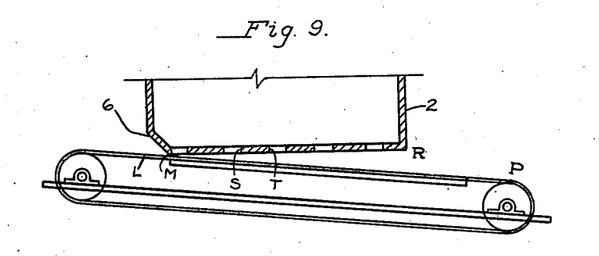
Figure 9 is a fragmentary elevation partly in section indicating a travelling belt discharging mechanism in suitable position relatively to the outlets of a bin.

Two principal types of unloading mechanism are indicated in Figures 8 and 9 respectively. In the apparatus diagrammatically indicated in Fig. 8, an inclined surface 4 is subjected to rapidly repeated impulses of small amplitude such as to cause movement of the granular material down the incline. There are a number of such "vibratory feeders" on the market, any of which might be applied in this connection, and the exact vibratory mechanism forms no part of the present invention. Such a vibratory device is indicated at 5 in Figure 8.

Figure 5:
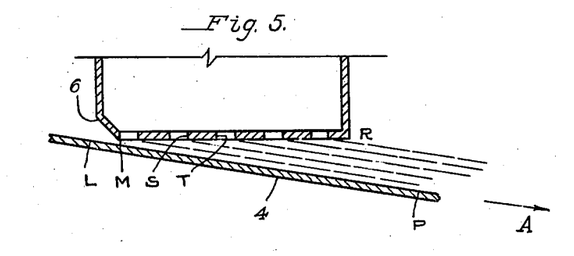
Figure 5 is a partial sectional elevation showing a portion of the lower part of the bin and showing an inclined grain-receiving surface in the preferred position for moving granular material from the storage bin.

The base of the bin in Figure 8 is in a substantially horizontal plane and the conveyor 4 has a small downward inclination. This downward inclination is small enough so that granular material does not leave the bin when the inclined surface is not being oscillated. In Figure 5 the upper surface LP of the inclined conveyor 4 is shown without an actuating means such as the vibrator or conveyor referred to above. RM indicates the lowest surface of the bin and L indicates the intersection of the plane RM (extended to the left) with the inclined plane PL. The distance LM from this intersection to the first hole of the bin should be equal approximately to the distance ST, that is the distance between adjacent holes. In Figure 8, LP is shown as the upper surface of an oscillating conveyor. In Figure 9, LP is shown as the upper surface of a conveyor belt. It is desirable to provide means in either case for adjustment of the slope of the inclined surface LP, and for adjustment of the distance LM to equality with the distance ST. To set the inclined plane at the proper angle and to have the spacings LM and ST approximately equal as just described, it is sometimes necessary to have a portion of the bottom edge of the bin set at an angle, as indicated at 6 in Figures 5, 8 and 9 so that the inclined surface PL may project upwardly beyond the horizontal plane at the bottom of the bin.

If in a device of this sort, the distance LM is made greater than the distance ST, it is found that the flow thru the first aperture onto the conveyor is so much greater than that from succeeding holes that the part of the bin immediately above the first hole is discharged much faster than the rest of the bin resulting in irregular flow of the bin contents and leading to segregation of the contents in an objectionable manner. Conversely, if ST is made greater than LM, the part of the bin above the first aperture is discharged more slowly than the rest of the bin, again resulting in lateral flow and segregation of the contents of the bin. If, however, LM is made equal to ST, as here specified, the contents of the bin flow at equal rates through all the apertures, resulting in complete emptying of the bin without lateral flow or increased segregation of the contents thereof.

The inclination of the conveyor to the base of the bin is chiefly important as it relates to the speed of outflow of granular material. The rate of delivery can be varied, while keeping the spacings LM and ST indicated in Fig. 5 the same by revolving the conveyor system about L to vary the inclination of the conveyor surface LP.

The angle that the inclined surfaces LP in Figures 8 and 9 make with the horizontal is less than the angle at which the grain would commence to slide down the surface while the latter is stationary.

In the description that has been given of the arrangement for the discharge of granular material, the base of the bin has been described as square or rectangular in shape. This arrangement is preferable when a flat belt is used to transfer the granular material from the base of the bin.

Figure 6:
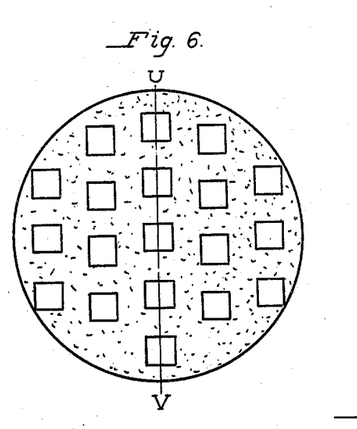
Figure 6 is a plan view of the base of a cylindrical bin having a circular base, the view being from beneath the base.
Figure 7:
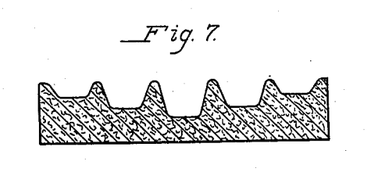
Figure 7 is a transverse section of a corrugated belt used for discharging the type of bin referred to in Figure 6.

The bin may be made, however, cylindrical throughout its entire length (and therefore have a circular base) providing suitable modification is made in the discharge apparatus, such as a special form of corrugated, grooved, or dished belt, is used to transfer the granular material. Such a discharge arrangement employing a corrugated belt is illustrated in Figures 6 and 7. The depth of the grooves in the central portion of the belt shown in Figure 7 is made greater than the depths of the grooves adjacent the sides of the belt. The relative depths of the corrugations or grooves or the amount of "dishing" are so chosen that the grain is discharged from the base of the bin in such a manner that the top surface of the grain in the bin shall remain approximately horizontal. In other words, the depth of the groves or the "dishing" in the central portion of the belt gives this portion of the belt sufficiently great capacity to take care of the greater volume of material from the central zone of the bin (adjacent the diameter UV).

The desired result is readily produced by making the depth of each of the various grooves roughly proportional to the number of apertures served by the groove in question, or by altering the shapes of the grooves to obtain a similar result. Such grooved or dished channels may be used with either vibratory or belt conveyors.

It will be noted that discharging devices of any of the types here described are self-closing in that downward flow of the grain in the bin is possible only when the belt is moving or the inclined surface or chute is vibrating or reciprocating. When the conveying or impulsive mechanism is stopped, the flow of grain from the bin likewise ceases. Hence the device is self-sealing when the conveyor is stopped. Moreover, since there is no free falling of material through the air at any time, the apparatus is dustless in operation even when handling finely pulverant materials.

It will be observed also that in a discharge mechanism of this type there are several factors of control possible which regulate the rate of feed so that groups of bins thus equipped may be used for proportioning the amounts of materials of same or different sizes and/or mixtures thereof coming from different bins. The various fractions can be collected on another conveyor and fed to mixing machinery, etc. The methods of control just referred to comprise, for example, adjustment of the speed of the belt or of the rate or amplitude of vibration of the inclined surface or chute or adjustment of the inclination of the grain receiving surface to the bottom of the bin.

Figure 10:
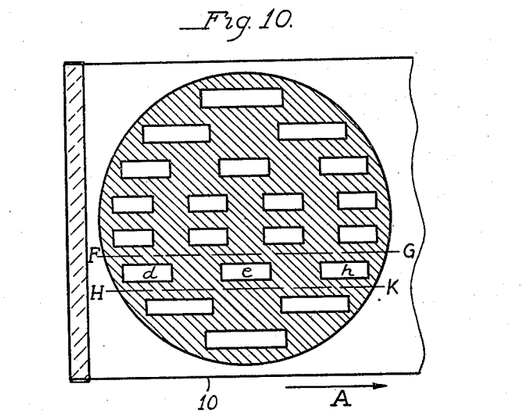
Figure 10 is a view partly in section of a discharging arrangement for a circular bin, the section being taken in a horizontal plane through the base of the bin.

Referring to Fig. 10, an arrangement of outlets for bins having a circular base is illustrated. The outlets are arranged in rows which are approximately parallel to the direction of motion of the grain on the conveyor 10, just under the bin. The combined area of the holes, for example $d$, $e$ and $h$, in any row is proportional to the area of the base of the bin contained between the corresponding chords FG and HK. In the case of the bin shown in Fig. 10, this ratio is approximately one half.

Figure 11:
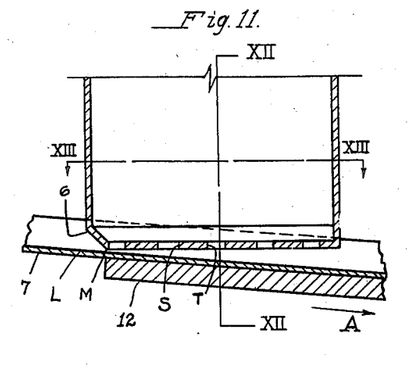
Figure 11 is a sectional elevation showing discharge apparatus for round bins which includes curved or dished belts.
Figure 12:
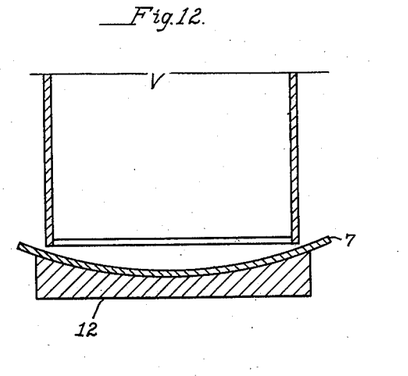
Figure 12 is a section on the line XII—XII of Fig. 11.
Figure 13:
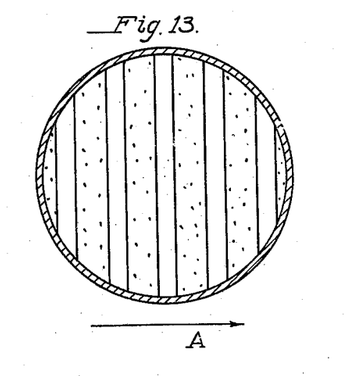
Figure 13 is a section on the line XIII—XIII of Fig. 11.
Figure 14:
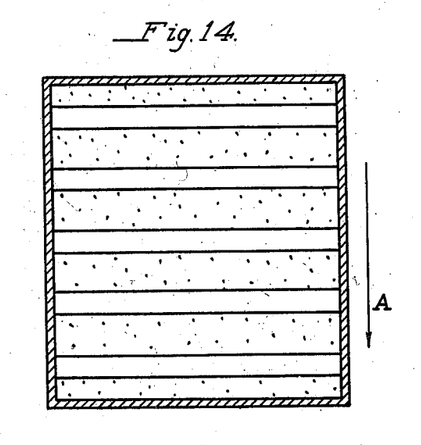
Figure 14 is a view similar to Figure 13 showing, however, a slotted base for a bin of rectangular cross-section.
Figure 15:
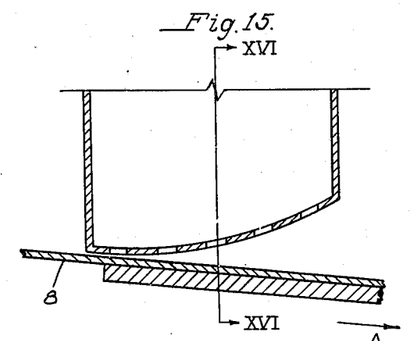
Figure 15 is a sectional elevation of discharging apparatus for a round bin in which the bin has a curved base and the conveyor belt is flat.
Figure 16:
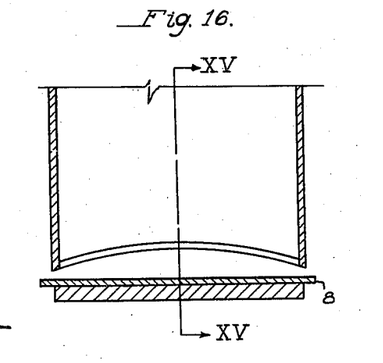
Figure 16 is a section on the line XVI—XVI of Fig. 15.

Figures 11, 12 and 13 show discharge apparatus for a circular bin in which the base of the bin is provided with slots whose long axes are perpendicular to the direction of travel of the conveyor 7 under the bin. The conveyor is in the form of a dished belt in which the depth of the receiving surface of the belt varies with the amount of the grain discharged from the openings in the bottom of the bin onto the upper surface of the belt. The portions of the receiving surface near the edges of the belt receive comparatively little grain and run correspondingly close to the lower surface of the base of the bin. The portions of the receiving surface of the belt which lie in between these edge portions have greater depth and correspondingly greater carrying capacity. The support 12 is shaped to maintain the belt in dished form desirable for removing the grain from the various rows of openings in the base of the bin at such a rate that the depth of deposit on the belt at different distances from the edges is proportional to the area of supply from the various rows of discharge openings under which the belt passes. The successive rows of discharge openings are approximately perpendicular to the edges of the belt and to the direction of travel of the belt. In Fig. 14 the same arrangement of the slots in the base perpendicular to the direction A of belt travel is shown in a bin having a rectangular base.

Figure 19:
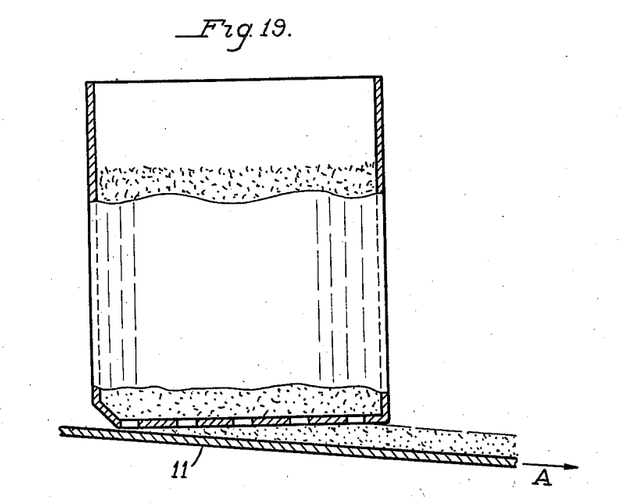
Figure 19 is an elevation of a rectangular storage bin provided with improved discharge mechanism, the bin being partly broken away to illustrate the even flow of the granular material.

In Figure 19 there is illustrated a rectangular bin having a discharge arrangement constructed in accordance with the present invention. Supposing that at any elevation within the bin, the top surface of the grain is approximately in a horizontal plane when the conveyor 11 is set in motion, the top surface of the grain remains approximately in a horizontal plane at all elevations as the grain is withdrawn through the orifices in the base. This same condition obtains with round bins equipped with the proper discharging device as disclosed above.

The several improved discharging devices described above can be used with bins that have rectangular bases or with bins that have circular bases. The discharging apparatus, however, of simplest construction is the one adaptable for use with the former type of base.

The upper surface of the conveyor under a rectangular base is not necessarily plane. Corrugated surfaces can be used to receive grain from the bin, the long axes of the corrugations for example being parallel to the motion of the grain on the conveyor.

Figure 17:
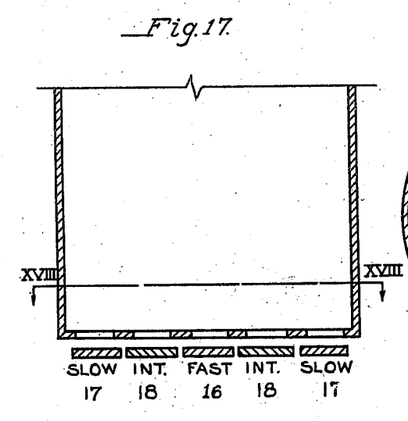
Figure 17 is a sectional elevation of discharging apparatus in which a round bin is discharged by means of a plurality of flat belts operating at different speeds.
Figure 18:
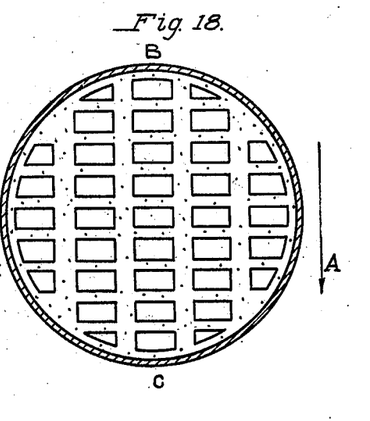
Figure 18 is a part plan and part sectional view of the base of the bin indicated in elevation in Figure 17.

In the case of bins of large lateral dimensions a plurality of parallel belts can be used without departing from the scope of the invention. For circular bins of large size a plurality of parallel belts may be employed, those serving the larger area (i. e. along a diameter in the direction of the discharging conveyor) travelling faster than those serving the smaller areas. An arrangment of this sort is illustrated in Figures 17 and 18. There the base of the round bin is provided with a plurality of outlets arranged in rows which are approximately parallel to the direction of motion of a number of discharging conveyor belts. The fast belt 16 receives grain from outlets distributed along the base diameter BC. The belts 18 run at an intermediate speed and belts 17 at a still slower speed.

The outlet openings in the bases of the bins illustrated in the drawings have been shown as slots or as squares or as rectangles. The combined area of the discharge openings usually varies between 15 and 75 per cent of the area of the base of the bin. With certain types of materials the area of the discharge openings may be substantially equal to the area of the base of the bin. The larger the ratio of the outlet areas to the area of the base, the more power is required to move the discharge conveyor and its load.

The efficiency of all of the above types of unloading equipment is evidenced by the fact that the profile or contour of the upper surface of the grain in a storage bin remains substantially the same while the bin is being emptied under the conditions described above until the lowest part of the upper surface reaches the orifices of the bin. For example, if the top surface of the grain in the storage bin is inclined at approximately the angle of repose (due to one-sided supply of grain to the bin in the filling operation), this inclined surface will remain at substantially the same slope during the discharging operation until the lowest edge of the inclined surface reaches the bottom of the bin. A similar phenomenon occurs when the upper surface of the grain in the bin is conical (due, for example, to supply of the grain from a small pipe whose outlet is above the center of the bin). These phenomena indicate that the flow of granular material proceeds with substantial uniformity downwardly across the transverse sections of the main portion of the bin. In addition to the visual evidence just described numerous screen analyses have demonstrated that unloaders of the type disclosed do not substantially alter distribution of the grain as it existed in the bin. Where the bin is filled with granular material distributed uniformly as to particle sizes in the various parts of the granular mass, the unloading means described and illustrated is effective in maintaining this desirable distribution during the transfer from the bin to molds or other containers used in the process of manufacture. On the other hand, a bin may be loaded with granular materials which are more or less segregated, for example, a bottom layer of coarse grit material on which is superposed a layer of fine grit material, followed by another layer of coarse material, etc. In this case the use of our improved discharging apparatus will remove materials at the base without substantial change of the order of distribution of the different grades of material in the bin.

Many variations may be made in the shapes of the container, in the shapes and sizes of the discharge holes or slots, and in the specific discharge apparatus without departing from the invention which is defined within the compass of the following claims:

We claim:

1. Discharging apparatus for distributing granular material of varied grain sizes without substantial increase of segregation and comprising a container for the granular material, a base for said container provided with spaced discharge openings whose outlet areas comprise 15 to 75 per cent of the area of the base and which are distributed with substantial uniformity over said basic area, a member having a discharge surface under said openings inclined downwardly from the horizontal at an angle less than the angle of repose of the granular material, and means for giving the member having the inclined surface rapidly recurring impulses which cause movement of granular material from the discharge openings down the inclined surface without substantial change of grit distribution.

2. Discharging apparatus for granular material comprising a container for the granular material having a plurality of grain sizes, said apparatus comprising a base for said container provided with spaced discharge openings whose outlet areas comprise 15 to 75 per cent of the area of the base and which are distributed with substantial uniformity over the area of said base, a discharge belt under said openings inclined downwardly from the horizontal at an angle less than the angle of repose for the granular material, and means for moving the belt and its load of granular material under the discharge openings in the direction of increasing clearance.

3. Apparatus for withdrawing granular material having a number of different grain sizes from a container in substantially unaltered distributed condition which comprises a base for said container having a series of openings which are arranged so that the distances between the centers of consecutive openings in a row is substantially the same and which are distributed with substantial uniformity over the area of said base, a member having a vibrating surface disposed under said container at an angle to the horizontal which is less than the angle of repose of the granular material, and means for producing small regular oscillations of said surface whose period is small as compared with the time of flow of the material through the openings.

4. Discharging apparatus for granular material composed of a number of different grain sizes and comprising a container for the granular material, a base for said container provided with spaced discharge openings which are distributed over the area of said base with substantial uniformity, a member having a grain receiving surface under said openings inclined downwardly from the horizontal at an angle less than the angle of repose for the granular material, and means for giving the member having the inclined surface rapidly recurring impulses which cause movement of granular material from the discharge openings down the inclined surface without substantial change of grit distribution.

5. Apparatus for discharging granular material composed of a number of different grain sizes from a container in substantially unaltered distributed condition, which apparatus comprises a container having a base provided with a series of substantially uniformly distributed openings, a member having a vibrating grain-receiving surface disposed under the base of said container at an angle to the horizontal which is less than the angle of repose of the granular material, and means for producing small regular impulses of said surface.

6. Apparatus for withdrawing from the base of a bin granular material composed of a number of different sizes and which is unevenly distributed as to grit sizes in said bin, without substantially changing the distribution of the material remaining in the bin, said apparatus comprising a container having a base provided with a series of openings in the base of the bin arranged so that the discharge areas are distributed with substantial uniformity over the base of the bin, a member having a grain-receiving surface disposed under said base at an angle to the horizontal which is less than the angle of repose of the granular material, and means for producing small impulses in said grain-receiving surface, the time between impulses being small as compared with the time of flow of the material from the body of the bin to the said grain-receiving surface.

7. A transmission device for handling granular material having a plurality of grain sizes, said device comprising a container provided with a rectangular base, a plurality of similarly shaped discharge openings in the base arranged in rows parallel to one of the sides of the base and distributed with substantial uniformity over the area of said base, a conveyor having a surface disposed to run downwardly under the base of the container for withdrawing grain from successive holes in any row onto a downwardly directed incline, the receiving surface of the conveyor lying wholly outside the base and intersecting the lowest plane of the bin in a line so related to the discharge openings in any row that the distance between said intersecting line and the nearest opening in a row is equal to the distance between consecutive openings in said row.

8. Apparatus for discharging granular material from a bin comprising a substantially horizontal base for the bin provided with a plurality of openings distributed thereover at approximately uniform intervals, and one or more movable conveyor members mounted under said base, each conveyor member having one or more granular material conveying surfaces which prevent flow of material in the bin through said openings when the conveyor members and conveyor surfaces are stationary, the granular material conveying surfaces of the conveyor members being inclined downwardly from the base of the bin at an angle to the horizontal less than the angle of repose of granular material to give increasing clearance space between the base of the bin and the granular material conveying surfaces of the one or more conveyor members, and means to actuate all the one or more conveyor members to impel the load of granular material thereon under the discharge openings in the direction of increasing clearance.

9. Apparatus for discharging granular or lump material from circular bins comprising a container having a base provided with a plurality of discharge openings arranged at substantially equal distances in parallel equidistant rows, the total areas of the openings in certain rows being substantially different from those in other rows, a conveyor belt arranged to run downwardly under each row, each conveyor belt being disposed with respect to the horizontal at an angle which is less than the angle of repose for the granular or lump material, and means for operating the belts simultaneously, the speed of each belt being proportional to the sum of the areas of the discharge openings in the row of such openings under which it runs.

10. A transmission device for handling granular or lump material comprising a bin of general cylindrical shape but having a rectangular base whose area is approximately equal to the cross sectional area of the cylinder, a plurality of openings in the base uniformly distributed over the area thereof, and a conveyor having a material supporting and conveying surface, at least part of said surface lying beneath the base and under the openings therein, the portion of such surface beneath the base lying wholly outside the base, said conveyor preventing the flow of material from the bin when said conveyor is not in operation, said conveyor being disposed with respect to the horizontal at an angle which is less than the angle of repose for the granular or lump material.

11. A transmission device for handling granular or lump material having a number of different grain sizes, said device comprising a bin of general cylindrical shape with a rectangular base, a plurality of openings in the rectangular base, said openings being of substantially uniform areas, the openings being distributed over the area of the base in a plurality of equidistant parallel rows, each row containing a plurality of separate individual openings spaced substantially equal distances from each other, a conveyor under the base which prevents the flow of material from the bin when said conveyor is not in operation but which when in motion withdraws material from the openings in the base in a direction whose horizontal component is parallel to a line joining the center of the openings in any row, said conveyor being disposed with respect to the horizontal at an angle which is less than the angle of repose for the granular or lump material.

12. Discharge apparatus for granular material having a plurality of grain sizes, said apparatus comprising a container for the granular material, a base for said container provided with spaced discharge openings distributed with substantial uniformity over said base, a discharge belt under said openings, said belt having a material supporting and conveying surface and being inclined downwardly from the horizontal at an angle less than the angle of repose for the granular material to give increasing clearance space between the conveying surface and the base of the container, the portion of said conveying surface beneath the base lying wholly outside the base, and means for moving the belt and its load of granular material under the discharge openings in the direction of the increasing clearance.

13. A transmission device for handling granular or lump material having a number of different grain sizes, said device comprising a bin of general cylindrical cross section with a rectangular base that has a plurality of openings of substantially uniform outlet area and distributed in equal distances in parallel equidistant rows within the area of the base and a conveyor lying under the base of the bin, said conveyor having a material supporting and conveying surface, the highest point or points of which under the base lie beneath the lowest plane of the base of the bin, said conveyor preventing the flow of material from the bin when said conveyor is not in operation, said conveyor being disposed with respect to the horizontal at an angle which is less than the angle of repose for the granular or lump material.

14. Apparatus for discharging granular material from a bin comprising a substantially horizontal base for the bin provided with spaced elongated discharge openings whose outlet areas comprise 15 to 75 per cent of the area of the base, said openings being distributed over the base at approximately uniform intervals, and one or more movable conveyor members mounted under said base, each conveyor member having one or more granular material conveying surfaces which prevent flow of material in the bin through said openings when the conveyor members and conveyor surfaces are stationary, the granular material conveying surfaces of the conveyor members being inclined downwardly from the base of the bin at an angle to the horizontal less than the angle of repose of the granular material to give increasing clearance space between the base of the bin and the granular material conveying surfaces of the one or more conveyor members for the grain in the direction of the movement of the conveyor members and the granular material carried thereby, said elongated discharge openings in the base being arranged with their long dimensions parallel to the direction of travel of the conveyor members, and means to actuate all the one or more conveyor members to impel the load of granular material thereon under the discharge openings in the direction of increasing clearance.

15. Apparatus for discharging granular material from a bin comprising a substantially horizontal base for the bin provided with spaced elongated discharge openings whose outlet areas comprise 15 to 75 per cent of the area of the base, said openings being distributed over the base at approximately uniform intervals, and one or more movable conveyor members mounted under said base, each conveyor member having one or more granular material conveying surfaces which prevent flow of material in the bin through said openings when the conveyor members and conveyor surfaces are stationary, the granular material conveying surfaces of the conveyor members being inclined downwardly from the base of the bin at an angle to the horizontal less than the angle of repose of the granular material to give increasing clearance space between the base of the bin and the granular material conveying surfaces of the one or more conveyor members for the grain in the direction of the movement of the conveyor members and the granular material carried thereby, said elongated discharge openings in the base being arranged with their long dimensions transverse to the direction of travel of the conveyor members, and means to actuate all the one or more conveyor members to impel the load of granular material thereon under the discharge openings in the direction of increasing clearance.

16. Apparatus for discharging granular material from a bin comprising a substantially horizontal base for the bin provided with spaced elongated discharge openings whose outlet areas comprise 15 to 75 per cent of the area of the base, said openings being distributed over the base at approximately uniform intervals, and one or more movable conveyor members mounted under said base, each conveyor member having one or more granular material conveying surfaces which prevent flow of material in the bin through said openings when the conveyor members and conveyor surfaces are stationary, the granular material conveying surfaces of the conveyor members being inclined downwardly from the base of the bin at an angle to the horizontal less than the angle of repose of the granular material to give increasing clearance space between the base of the bin and the granular material conveying surfaces of the one or more conveyor members for the grain in the direction of the movement of the conveyor members and the granular material carried thereby, said elongated discharge openings in the base being arranged so that each extends at least substantially completely across the base and with their long dimensions transverse to the direction of travel of the conveyor members, and means to actuate all the one or more conveyor members to impel the load of granular material thereon under the discharge openings in the direction of increasing clearance.

CHARLES F. GEIGER.
CHANNING P. CLAPP.
WILLIAM C. KEMPF.